United States Patent
Seo et al.

(10) Patent No.: US 8,500,286 B2
(45) Date of Patent: Aug. 6, 2013

(54) PROJECTION SYSTEM

(75) Inventors: Eunsung Seo, Seoul (KR); Seungman Jeong, Seoul (KR); Hyunho Choi, Seoul (KR); Sanghun Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 168 days.

(21) Appl. No.: 13/044,187

(22) Filed: Mar. 9, 2011

(65) Prior Publication Data

US 2011/0249239 A1 Oct. 13, 2011

(30) Foreign Application Priority Data

Apr. 9, 2010 (KR) .................. 10-2010-0032966

(51) Int. Cl.
*G03B 21/14* (2006.01)
(52) U.S. Cl.
USPC ............. 353/20; 353/31; 353/38; 353/33; 353/98; 353/99; 349/5; 359/204.1
(58) Field of Classification Search
USPC ............. 353/31, 38, 28–30, 34, 37, 20, 33, 353/98, 99; 359/487, 204.1, 316, 443, 453–456, 359/583; 349/5, 7–9, 27; 348/771
See application file for complete search history.

(56) References Cited

U.S. PATENT DOCUMENTS

| | | | | |
|---|---|---|---|---|
| 5,371,559 A * | 12/1994 | San-Nohe et al. | | 353/31 |
| 5,387,953 A * | 2/1995 | Minoura et al. | | 353/20 |
| 6,019,474 A * | 2/2000 | Doany et al. | | 353/33 |
| 6,457,832 B1 * | 10/2002 | Okuyama | | 353/38 |
| 6,560,048 B1 * | 5/2003 | Okamori et al. | | 359/833 |
| 6,573,950 B1 * | 6/2003 | Hirata et al. | | 348/744 |
| 6,652,105 B1 * | 11/2003 | Peterson et al. | | 353/98 |
| 7,152,981 B2 * | 12/2006 | Eckhardt | | 353/98 |
| 7,255,444 B2 * | 8/2007 | Nakashima et al. | | 353/20 |
| 7,350,928 B2 * | 4/2008 | Liao et al. | | 353/81 |
| 7,360,899 B2 * | 4/2008 | McGuire et al. | | 353/20 |
| 7,362,507 B2 * | 4/2008 | Duncan et al. | | 359/637 |
| 7,612,951 B2 * | 11/2009 | Masui et al. | | 359/811 |
| 2004/0207814 A1 * | 10/2004 | Bierhuizen | | 353/20 |
| 2005/0105061 A1 * | 5/2005 | DeLong | | 353/99 |
| 2005/0179871 A1 * | 8/2005 | Kobayashi et al. | | 353/31 |
| 2008/0036973 A1 * | 2/2008 | Kojima et al. | | 353/38 |
| 2008/0049190 A1 * | 2/2008 | Destain et al. | | 353/20 |
| 2009/0009720 A1 * | 1/2009 | Chen et al. | | 353/20 |
| 2009/0141503 A1 * | 6/2009 | Phillips, III | | 362/311.06 |

* cited by examiner

Primary Examiner — Georgia Y Epps
Assistant Examiner — Sultan Chowdhury
(74) Attorney, Agent, or Firm — Saliwanchik, Lloyd & Eisenschenk

(57) ABSTRACT

A projection system is disclosed, the projection system including: an illumination unit; a PBS (Polarizing Beam Splitter) reflecting the light from the illumination unit, transmitting an image light, having a width larger than that of entrance pupil through which the image light is incident, and having a structure in which a width of an area facing projection lenses is larger than that of an area perpendicular to an area facing the projection lenses; a display device receiving the light reflected from the PBS and outputting the light as an image light; and a projection unit mounted with the projection lenses for projecting the image light outputted from the display device to a screen.

17 Claims, 7 Drawing Sheets

PROJECTION SYSTEM

CROSS-REFERENCE TO RELATED APPLICATION

This application claims the benefit under 35 U.S.C. §119 of Korean Patent Application No. 10-2010-0032966, filed Apr. 9, 2010, which is hereby incorporated by reference in its entirety.

BACKGROUND OF THE DISCLOSURE

1. Field of the Invention

Embodiments of the present disclosure may relate to a projection system configured to remove a ghost.

2. Description of Related Art

Generally, an optical system of a projection system may be categorized into two types, that is, an illumination system, and a projection system. The illumination system is configured such that light emitted from a light source is equally illuminated to a small-sized imager via an FEL (Fly Eye Lens) or an integrator which is an optical tunnel, and the projection system is configured such that an illuminated light is incident on each panel via the illumination system, where an image is enlarged to be captured on a screen.

The illumination system includes a collimation lens, a color combining element, an integrator and a light collecting lens. Generally, the light source generates light from a small space, where the light spreads to all directions. At this time, the collimation lens collects the light emitted and spread from the light source and allows the light to form at a small angle.

The light source that uses an LED (Light Emitting Diode) includes three LED chips including a red LED, a green LED and a blue LED for increasing brightness and color reproduction range. A process is needed to combine the three colors emitted from the three LEDs into a light path, and an element doing the job is called a color combining element.

Furthermore, a shape of light emitted from a light source and a shape of a screen element differ to generate loss of light intensity and to fail to accomplish a uniform light intensity. Light emitted from the collimation lens is also non-uniform. Therefore, an integrator is utilized to match the shape of light emitted from the light source to the shape of the screen element where the light is collected.

Still furthermore, the projection system functions to enlarge an image light implemented by the screen element and to allow the image light to be captured on a screen.

BRIEF SUMMARY

The present disclosure is to solve a subject of removing a ghost.

Technical subjects to be solved by the present disclosure are not restricted to the above-mentioned description, and any other technical problems not mentioned so far will be clearly appreciated from the following description by the skilled in the art.

In one general aspect of the present disclosure, there is provided a projection system, the projection system comprising: an illumination unit; a PBS (Polarizing Beam Splitter) reflecting the light from the illumination unit, transmitting an image light, having a width larger than that of entrance pupil through which the image light is incident, and having a structure in which a width of an area facing projection lenses is larger than that of an area perpendicular to an area facing the projection lenses; a display device receiving the light reflected from the PBS and outputting the light as an image light; and a projection unit mounted with the projection lenses for projecting the image light outputted from the display device to a screen.

In some exemplary embodiments of the present disclosure, the projection lenses may be arranged by being inserted into a through hole of a body tube, and a through hole area through which the image light is projected to the screen through the projection lenses is defined as an exit pupil, wherein the exit pupil is formed with a sill for inhibiting the projection lenses from being deviated, and inhibiting an image light component hitting a lateral surface of the PBS from exiting to the exit pupil.

In some exemplary embodiments of the present disclosure, the projection lenses may be arranged by being inserted into a through hole of a body tube, and the image light component hitting a lateral surface of the PBS is absorbed by the body tube and fails to be included in the image light projected to the screen.

In some exemplary embodiments of the present disclosure, the display device may be a reflective display device or a projection display device including one of an LCOS (Liquid Crystal On Silicon) or a DMD (Digital Mirror Device).

In some exemplary embodiments of the present disclosure, the PBS may take the shape of a rectangular pillar.

In some exemplary embodiments of the present disclosure, the projection system may be inclined at an area surrounding the entrance pupil of the body tube.

In some exemplary embodiments of the present disclosure, a diameter of the entrance pupil at the body tube may be larger than that of the exit pupil at the body tube.

In some exemplary embodiments of the present disclosure, an inner lateral wall of the through hole at the body tube may be formed with an absorption film.

In some exemplary embodiments of the present disclosure, the absorption film may be formed with a saw-tooth pattern.

In another general aspect of the present disclosure, there is provided a projection system, the projection system comprising: an illumination unit; any one PBS (Polarizing Beam Splitter) from a PBS reflecting the light from the illumination unit, transmitting an image light, having a width larger than that of entrance pupil through which the image light is incident, and having a cross-section of a trapezoid with its broader width facing the projection lens, a PBS having a cross-section of a trapezoid with its broader surface facing the display device, a PBS having a cross-section of a rectangle whose width toward the projection lens is greater than that toward the display device, and a PBS whose incident width toward the illumination unit takes the shape of a lens; and a display device receiving the light reflected from the PBS and outputting the light as an image light; and a projection unit mounted with the projection lenses for projecting the image light outputted from the display device to a screen.

In some exemplary embodiments of the present disclosure, the projection lenses may be arranged by being inserted into a through hole of a body tube, and a through hole area through which the image light is projected to the screen through the projection lenses is defined as an exit pupil, wherein the exit pupil is formed with a sill for inhibiting the projection lenses from being deviated, and inhibiting an image light component hitting a lateral surface of the PBS from exiting to the exit pupil.

In some exemplary embodiments of the present disclosure, the projection lenses may be arranged by being inserted into a through hole of a body tube, and the image light component hitting a lateral surface of the PBS is absorbed by the body tube and fails to be included in the image light projected to the screen.

In some exemplary embodiments of the present disclosure, the display device may be a reflective display device or a projection display device including one of an LCOS (Liquid Crystal On Silicon) and a DMD (Digital Mirror Device).

In some exemplary embodiments of the present disclosure, the projection system may be inclined at an area surrounding the entrance pupil of the body tube.

In some exemplary embodiments of the present disclosure, a diameter of the entrance pupil at the body tube may be larger than that of the exit pupil at the body tube.

In some exemplary embodiments of the present disclosure, an inner lateral wall of the through hole at the body tube may be formed with an absorption film.

In some exemplary embodiments of the present disclosure, the absorption film may be formed with a saw-tooth pattern.

The projection system according to the present disclosure has an advantageous effect in that the system is formed with a PBS not taking the shape of a square pillar, and has a greater width of an entrance pupil into which an image light is incident, thereby removing a ghost.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

Accompanying drawings are included to provide a further understanding of arrangements and embodiments of the present disclosure and are incorporated in and constitute a part of this application. In the following drawings, like reference numerals refer to like elements and wherein.

Figure 1:
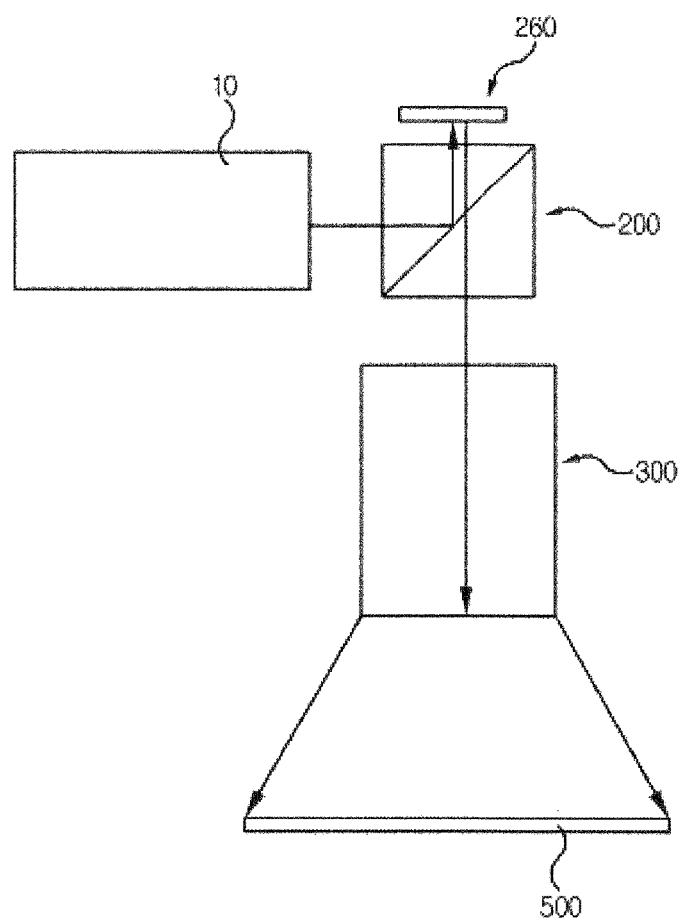
FIG. 1 is a schematic structural view illustrating a projection system according to the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure are described in detail with reference to the accompanying drawings. In the drawings, sizes or shapes of constituent elements may be exaggerated for clarity and convenience.

Particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification. Acronyms are used extensively throughout the description to avoid excessively long descriptive phrases. The meaning will be clear from the context of the description.

FIG. 1 is a schematic structural view illustrating a projection system according to the present disclosure.

The projection system according to the present disclosure may include an illumination unit (10); a PBS (Polarizing Beam Splitter. 200) reflecting light from the illumination unit and transmitting an image light; a display device (260) receiving the light reflected from the PBS and outputting the light as an image light; and a projection unit (300) projecting the image light outputted from the display device (260) to a screen (500).

The projection system according to the present disclosure can remove a ghost on a projected screen by changing a shape of a PBS (200) to inhibit an image light projected on a screen from generating a ghost, as described later.

Figure 2:
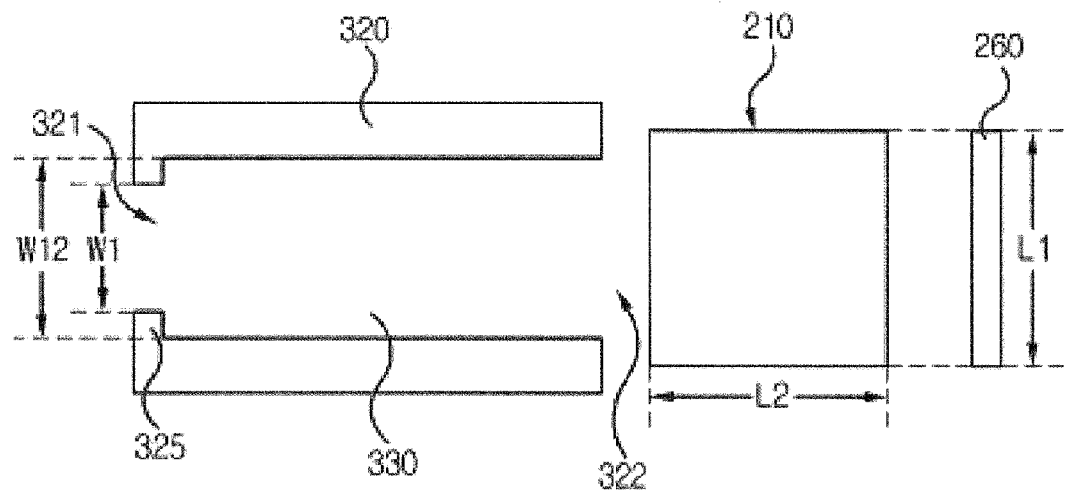
FIG. 2 is a schematic structural view illustrating a configuration of a projection system for removing a ghost according to the present disclosure.

FIG. 2 is a schematic structural view illustrating a configuration of a projection system for removing a ghost according to the present disclosure.

In order to remove the ghost in the projection system, the PBS should not be shaped of a square pillar. That is, the PBS according to the present exemplary embodiment of the present disclosure is configured to have a structure in which a width of an area facing projection lenses is larger than that of an area perpendicular to an area facing the projection lenses.

For example, as shown in FIG. 2, an example of a PBS that is supposed to be applied to the projection system of the present disclosure is that, if a width of an area facing the projection lenses is defined as 'L1', and a width of an area perpendicular to an area facing the projection lenses is defined as 'L2', the PBS of the present disclosure has a structure satisfying a condition of L1>L2.

FIG. 2 is a schematic structural view illustrating a configuration of a PBS (210) having a square pillar satisfying the condition of L1>L2.

The body tube (320) is formed with a through hole (330) into which the projection lenses are inserted and arranged therein, where a through hole (330) area incident by an image light of the display device (260) through the PBS (210) is defined as an 'entrance pupil (322)', and a through hole (330) area through which the image light is projected to the screen via the projection lenses is defined as an 'exit pupil (321)'.

Therefore, due to the fact that the PBS according to the present disclosure has a configuration satisfying the condition of L1>L2, the image light hitting the lateral surface of the PBS (210) may not enter the entrance pupil (322), or even if the image light hitting the lateral surface of the PBS (210) enters the entrance pupil (322), the image light is absorbed by the through hole (330) of the body tube (320) and is not projected to the screen through the projection lenses to inhibit the ghost from occurring, because the width of an area facing the projection lenses is wider.

At this time, the PBS (210) may be designed in such a fashion that the width (L1) of the area facing the projection lenses is greater than a width (W2) of the entrance pupil (322), and the width (W2) of the entrance pupil (322) is greater than a width (W1) of the exit pupil (321). Furthermore, the display device (260) may be is a reflective display device or a projection display device including one of an LCOS (Liquid Crystal On Silicon) and a DMD (Digital Mirror Device).

Figure 3:
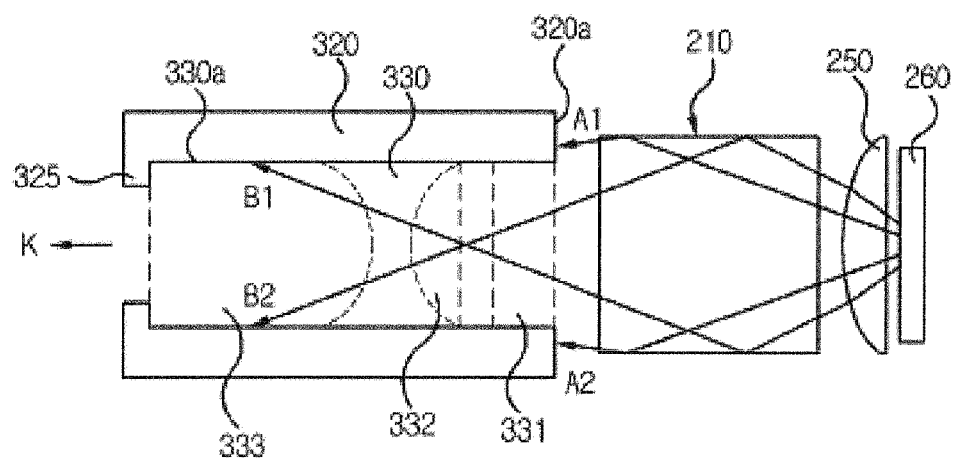
FIG. 3 is a schematic conceptual view illustrating an operation of removing a ghost in a projection system according to the present disclosure.
Figure 4:
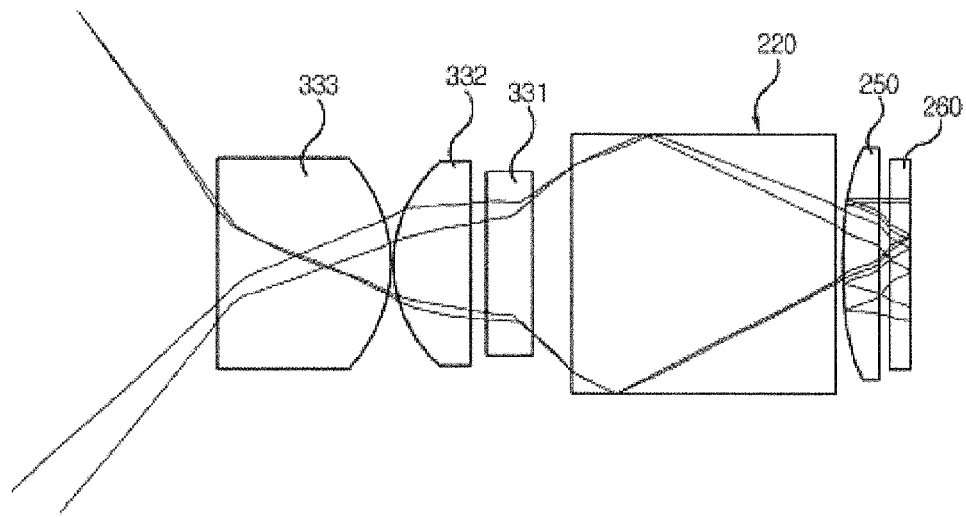
FIG. 4 is a schematic conceptual view illustrating an operation of generating a ghost in a conventional projection system.

FIG. 3 is a schematic conceptual view illustrating an operation of removing a ghost in a projection system according to the present disclosure, and FIG. 4 is a schematic conceptual view illustrating an operation of generating a ghost in a conventional projection system.

First, referring to FIG. 4, due to the fact that a conventional projection system is formed with a PBS (220) taking the shape of a square pillar, an image light from a display device (260) may hit the lateral surface of the PBS (220) through a lens (250) to be projected to a screen through projection lenses (331, 332, 333), thereby creating an undesired ghost on the screen.

That is, the square-shaped pillar PBS (220) forms an optical track of an image light of the display device (260) being projected onto the screen through the projection lenses (331, 332, 333). For reference, an image light component incident on the projection lenses (331, 332, 333) has a high likelihood of creating a ghost by hitting the lateral surface of the PBS (220). Furthermore, a large quantity of light may exist between the projection lenses (331, 332, 333) and the display device (260), and many other lights may exist that are not anticipated during the designing stage. These lights may be reflected from the lens instead of being refracted, or may be reflected from enclosures holding an optical system, or may be scattered from lens surface to become a cause of creating a ghost. The ghost may decrease the brightness of the screen, or may be collected on the screen to create an undesired white area or a dual image.

In order to eliminate the ghost, as illustrated in FIG. 3, the projection system is such that the PBS (210) does not take the shape of a square pillar, has a structure having a width greater than that of an entrance pupil incident by an image light to the projection lenses (331, 332, 333), and satisfies the condition of L1>L2, whereby image light components (A1, A2, B1, B2) incident to the projection lenses (331, 332, 333) by hitting the lateral surface of the PBS (210) come to have a path toward a body tube (320) optically guiding the projection lenses (331, 332, 333), and an image light (K) projected on a screen through the projection lenses (331, 332, 333) does not include the image light components (A1, A2, B1, B2) incident to the projection lenses (331, 332, 333) by hitting the lateral surface of the PBS (210).

To be more specific, the first image light components (A1, A2) that hit the lateral surface of the PBS (210) are absorbed by a surrounding area (320a) of the entrance pupil of the body tube (320), and the second image light components (B1, B2) are incident onto the entrance pupil of the body tube (320) to be absorbed by an inner lateral wall (330a) of the through hole (330) into which the projection lenses (331, 332, 333) are inserted.

At this time, the exit pupil that is defined by an area of through hole (330) where the image lights are projected to the screen through the projection lenses (331, 332, 333) inhibits the projection lenses (331, 332, 333) from being deviated and is formed with a sill (325) that inhibits the second image light components (B1, B2) that hit the lateral surface of the PBS (210) from slipping to the exit pupil.

Therefore, the projection system according to the present disclosure has an advantage in that the system is formed with a PBS not of square pillar, and has a structure of a wider width than that of an entrance pupil into which image lights of the projection lenses are incident, thereby inhibiting the ghost from occurring.

Figure 5:
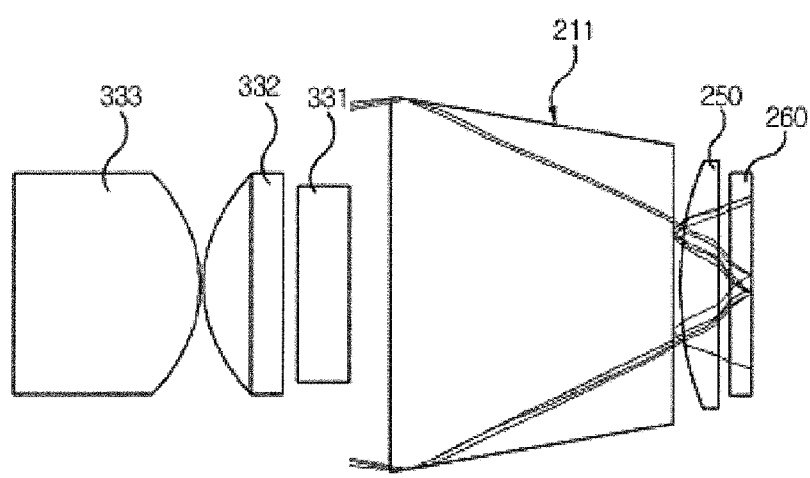
FIG. 5 is a schematic conceptual view illustrating an operation of removing a ghost in a projection system having a PBS according to a first exemplary embodiment of the present disclosure.
Figure 6:
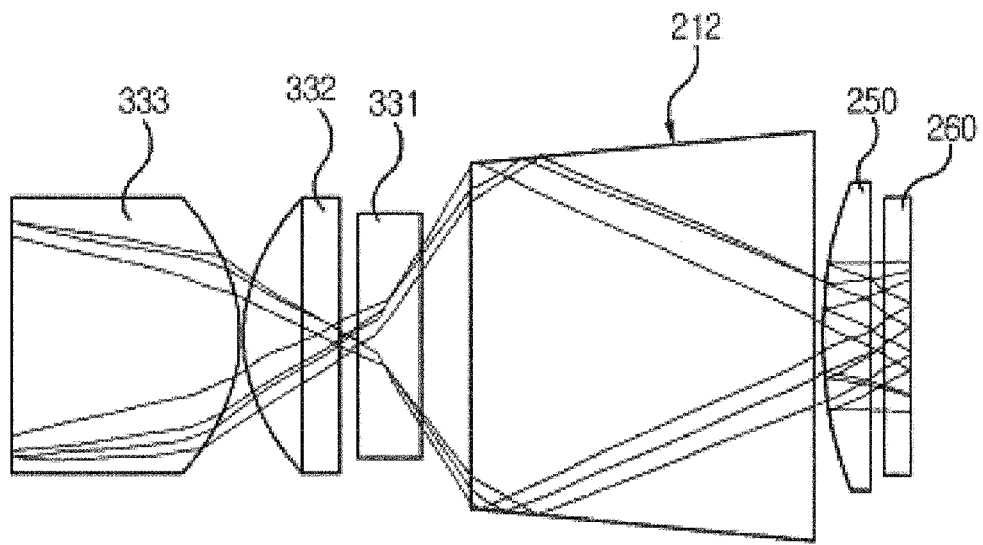
FIG. 6 is a schematic conceptual view illustrating an operation of removing a ghost in a projection system having a PBS according to a second exemplary embodiment of the present disclosure.
Figure 7:
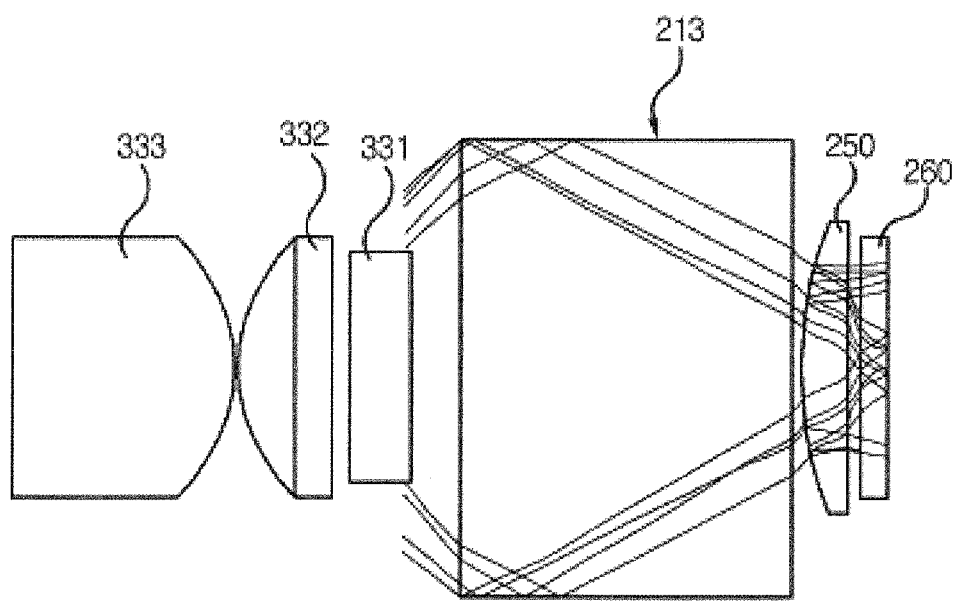
FIG. 7 is a schematic conceptual view illustrating an operation of removing a ghost in a projection system having a PBS according to a third exemplary embodiment of the present disclosure.
Figure 8:
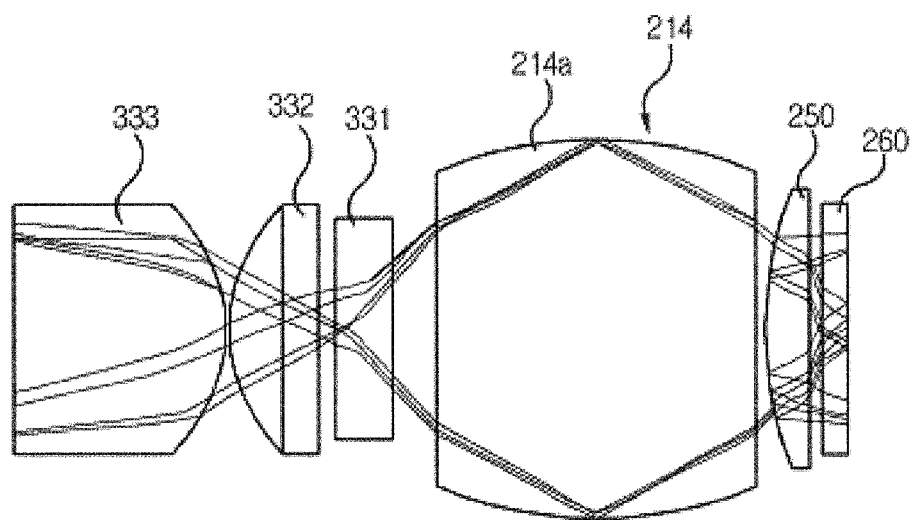
FIG. 8 is a schematic conceptual view illustrating an operation of removing a ghost in a projection system having a PBS according to a fourth exemplary embodiment of the present disclosure.

FIG. 5 is a schematic conceptual view illustrating an operation of removing a ghost in a projection system having a PBS according to a first exemplary embodiment of the present disclosure, FIG. 6 is a schematic conceptual view illustrating an operation of removing a ghost in a projection system having a PBS according to a second exemplary embodiment of the present disclosure, FIG. 7 is a schematic conceptual view illustrating an operation of removing a ghost in a projection system having a PBS according to a third exemplary embodiment of the present disclosure, and FIG. 8 is a schematic conceptual view illustrating an operation of removing a ghost in a projection system having a PBS according to a fourth exemplary embodiment of the present disclosure.

As noted from the foregoing, it would be enough that the PBS of the projection system has a structure in which the PBS is not of square pillar, and a structure of a wider width than that of an entrance pupil into which image lights of the projection lenses are incident.

That is, the PBS of the projection system may be realized by a PBS (211) having a cross-section of a trapezoid with its broader width facing the projection lens (FIG. 5), a PBS (212) having a cross-section of a trapezoid with its broader surface facing the display device (FIG. 6), a PBS (213) having a cross-section of a rectangle whose width toward the projection lens is greater than that toward the display device (FIG. 7), and a PBS (214) whose incident width toward the illumination unit takes the shape of a lens (FIG. 8).

First, in the PBS (211) having a cross-section of a trapezoid with its broader width facing the projection lens (FIG. 5) and the PBS (213) having a cross-section of a rectangle whose width toward the projection lens is the same as that toward the display device (FIG. 7), the image light component hitting the lateral surface of the PBSs (211, 213) proceeds to a surrounding area of the entrance pupil at the body tube to be absorbed by the body tube, and is not incident on the projection lenses (331, 332, 333), such that the component is not included in the image light projected to the screen.

Furthermore, in the PBS (212) having a cross-section of a trapezoid with its broader surface facing the display device (FIG. 6), and the PBS (214) whose incident width toward the illumination unit takes the shape of a lens (FIG. 8), although the image light component hitting the lateral surface of the PBSs (212, 214) proceed to a surrounding area of the entrance pupil at the body tube, but is absorbed by hitting the inner lateral wall of the through hole of the body tube or by the sill of the exit pupil, such that the component is not projected to the screen.

At this time, the PBSs of FIGS. 7 and 8 have the structure that satisfies the condition of L1>L2. Furthermore, the PBSs of FIGS. 5 and 6 have the structure that does not satisfy the condition of L1>L2, such that the ghost can be removed.

Figure 9:
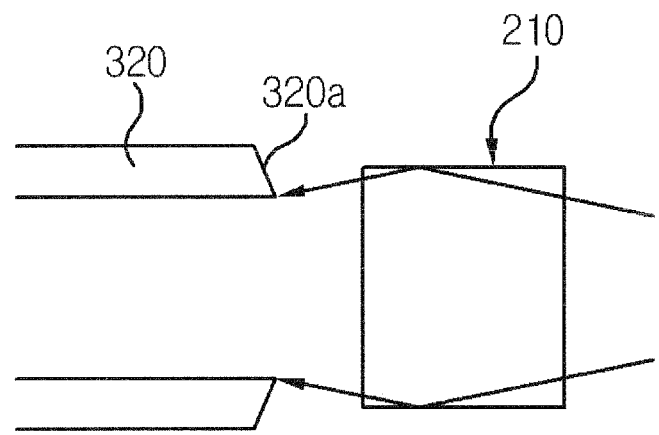
FIG. 9 is a schematic conceptual view illustrating a structure of a body tube capable of removing a ghost in a projection system according to the present disclosure.
Figure 10:
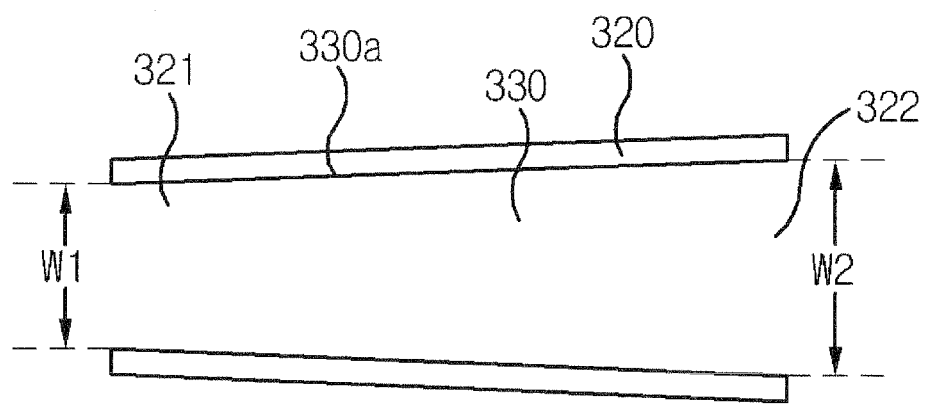
FIG. 10 is a schematic conceptual view illustrating another structure of a body tube capable of removing a ghost in a projection system according to the present disclosure.

FIG. 9 is a schematic conceptual view illustrating a structure of a body tube capable of removing a ghost in a projection system according to the present disclosure, and FIG. 10 is a schematic conceptual view illustrating another structure of a body tube capable of removing a ghost in a projection system according to the present disclosure.

The image light emitted from the display device passes the PBS (210) to be incident on the entrance pupil of the body tube (320). At this time, the image light that has hit the lateral surface of the PBS (210) becomes a cause of creating a ghost when projected to the screen. As a result, if the area (320a) about the entrance pupil of the body tube (320) is made to incline, the image light that has hit the lateral surface of the PBS (210) can be reflected to outside of the body tube (320) from the area (320a) about the inclined entrance pupil.

Therefore, the image light incident on the area (320a) about the inclined entrance pupil cannot enter the entrance pupil to thereby inhibit the ghost from being generated.

As illustrated in FIG. 10, a diameter (W2) of the entrance pupil (322) at the body tube (320) may be designed to be greater than that (W1) of the exit pupil (321) at the body tube (320). At this time, the image light that has hit the lateral surface of the PBS (210) becomes incident on the entrance pupil (322) of the body tube (320) having a relatively greater diameter (W2), to thereby increase the probability of the image light being absorbed by the inner lateral wall (330a) of the through hole (330) at the body tube (320), whereby the generation of ghost can be eliminated.

Figure 11:
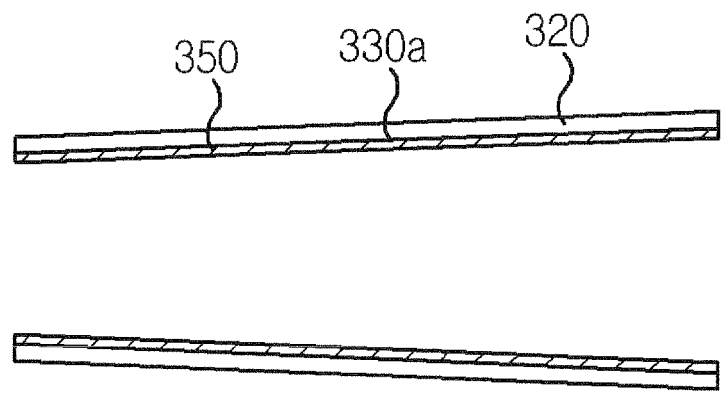
FIG. 11 is a schematic conceptual view illustrating still another structure of a body tube capable of removing a ghost in a projection system according to the present disclosure.
Figure 12A:
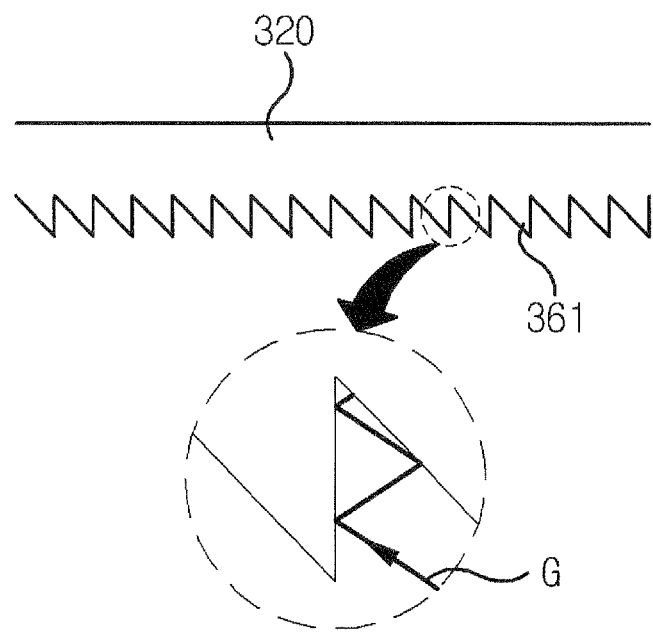
FIGS. 12a and 12b are partial cross-sectional views illustrating a body tube and a pattern formed with an absorption film in a projection system according to the present disclosure.
Figure 12B:
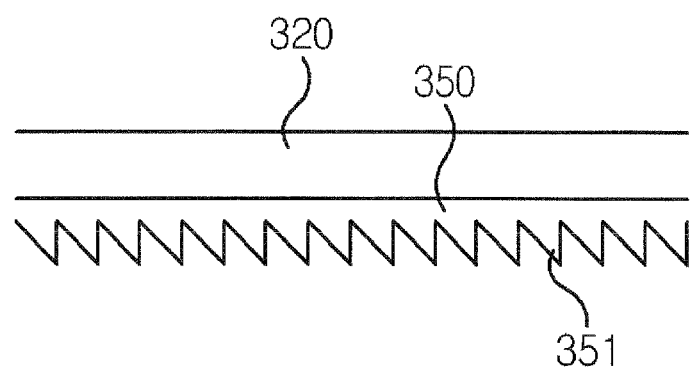

FIG. 11 is a schematic conceptual view illustrating still another structure of a body tube capable of removing a ghost in a projection system according to the present disclosure, and FIGS. 12a and 12b are partial cross-sectional views illustrating a body tube and a pattern formed with an absorption film in a projection system according to the present disclosure.

An absorption film (350) may be formed at the inner lateral wall (330a) of the through hole (330) at the body tube (320) in order to increase the absorptance rate of the image light that generates the ghost from the inner lateral wall (330a) of the through hole (330) at the body tube (320), as illustrated in FIG. 11. Furthermore, in order to increase the absorptance rate of the image light that generates the ghost, the absorption film may be formed with a saw-tooth pattern (351), or the inner lateral wall (330a) of the through hole (330) at the body tube (320) may be formed with a saw-tooth pattern (361).

The saw-tooth patterns (351, 361) may be concave, and an image light (G) that generates a ghost may be incident on the concave portion to be absorbed, or the image light component that has failed to be absorbed into the concave portion may be reflected and absorbed by the concave portion, and cannot escape from the exit pupil of the body tube (320).

The above-mentioned projection system according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A projection system, the projection system comprising:
   an illumination unit;
   a PBS (Polarizing Beam Splitter) reflecting the light from the illumination unit, transmitting an image light, and having a structure in which a width of an area facing projection lenses is larger than that of an area perpendicular to an area facing the projection lenses;
   a display device receiving the light reflected from the PBS and outputting the light as an image light; and
   a projection unit including a body tube having an entrance pupil and an exit pupil, and a through hole equipped with the projection lenses for projecting the image light outputted from the display device to a screen;
   wherein the entrance pupil is a path into which the image light is incident towards the projection unit, the exit pupil is a path through which the image light is projected to the screen via the projection lenses, and
   wherein a width of the PBS is larger than that of the entrance pupil to inhibit formation of a ghost by the image light.

2. The projection system of claim 1, wherein the projection lenses are arranged by being inserted into a through hole of a body tube, and a through hole area through which the image light is projected to the screen through the projection lenses is defined as an exit pupil, wherein the exit pupil is formed with a sill for inhibiting the projection lenses from being deviated, and inhibiting an image light component hitting a lateral surface of the PBS from exiting to the exit pupil.

3. The projection system of claim 1, wherein the projection lenses are arranged by being inserted into a through hole of a body tube, and the image light component hitting a lateral surface of the PBS is absorbed by the body tube and fails to be included in the image light projected to the screen.

4. The projection system of claim 1, wherein the display device is a reflective display device or a projection display device including one of an LCOS (Liquid Crystal On Silicon) and a DMD (Digital Mirror Device).

5. The projection system of claim 1, wherein the PBS takes the shape of a rectangular pillar.

6. The projection system of claim 2, wherein the body tube is inclined at an area surrounding the entrance pupil.

7. The projection system of claim 2, wherein a diameter of the entrance pupil at the body tube is larger than that of the exit pupil at the body tube.

8. The projection system of claim 2, wherein an inner lateral wall of the through hole at the body tube is formed with an absorption film.

9. The projection system of claim 8, wherein the absorption film is formed with a saw-tooth pattern.

10. A projection system, the projection system comprising:
an illumination unit;
a PBS (Polarizing Beam Splitter) reflecting the light from the illumination unit, transmitting an image light, wherein the PBS has a characteristic selected from the group consisting of: a cross-section of a trapezoid with its broader width facing the projection lens; a cross-section of a trapezoid with its broader surface facing the display device; a cross-section of a rectangle whose width toward the projection lens is the same as that toward the display device; and an incident width toward the illumination unit having the shape of a lens;
a display device receiving the light reflected from the PBS and outputting the light as an image light; and
a projection unit including a body tube having an entrance pupil and an exit pupil, and a through hole equipped with the projection lenses for projecting the image light outputted from the display device to a screen;
wherein the entrance pupil is a path into which the image light is incident towards the projection unit,
the exit pupil is a path through which the image light is projected to the screen via the projection lenses, and
wherein a width of the PBS is lager than that of the entrance pupil to inhibit formation of a ghost by image light.

11. The projection system of claim 10, wherein the projection lenses are arranged by being inserted into a through hole of a body tube, and a through hole area through which the image light is projected to the screen through the projection lenses is defined as an exit pupil, wherein the exit pupil is formed with a sill for inhibiting the projection lenses from being deviated, and inhibiting an image light component hitting a lateral surface of the PBS from exiting to the exit pupil.

12. The projection system of claim 10, wherein the projection lenses are arranged by being inserted into a through hole of a body tube, and the image light component hitting a lateral surface of the PBS is absorbed by the body tube and fails to he included in the image light projected to the screen.

13. The projection system of claim 10, wherein the display device is a reflective display device or a projection display device including one of an LCOS (Liquid Crystal On Silicon) and a DMD (Digital Mirror Device).

14. The projection system of claim 11, wherein the body tube is inclined at an area surrounding the entrance pupil.

15. The projection system of claim 11, wherein a diameter of the entrance pupil at the body tube is larger than that of the exit pupil at the body tube.

16. The projection system of claim 11, wherein an inner lateral wall of the through hole at the body tube is formed with an absorption film.

17. The projection system of claim 11, wherein the absorption film is formed with a saw-tooth pattern.

* * * * *